March 2, 1954  W. L. STIVASON ET AL  2,670,762
FLEXIBLE HOSE
Filed Jan. 22, 1951
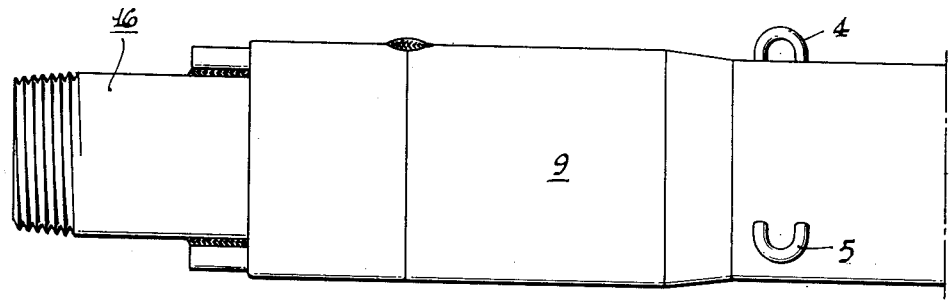
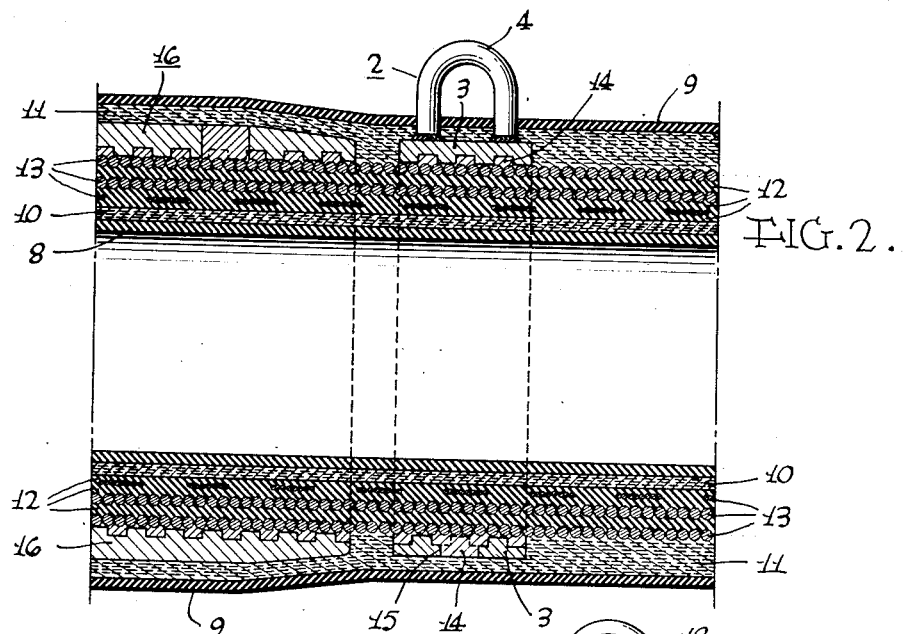
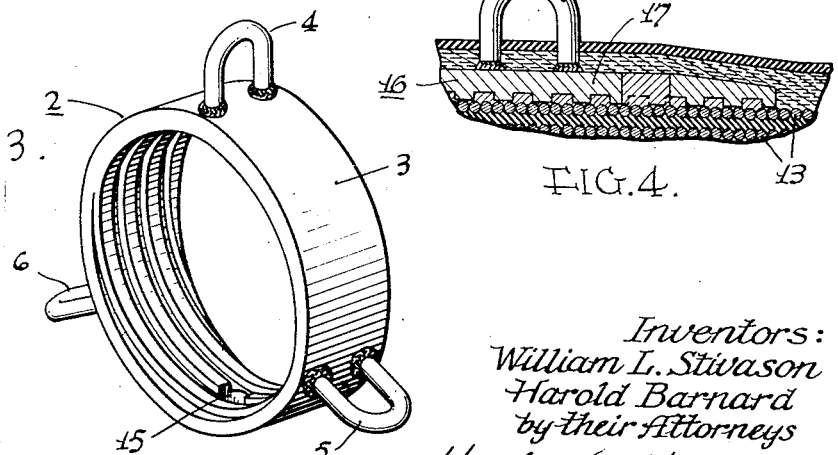
Inventors:
William L. Stivason
Harold Barnard
by their Attorneys
Howson & Howson Patented Mar. 2, 1954

2,670,762

UNITED STATES PATENT OFFICE 2,670,762

FLEXIBLE HOSE

William L. Stivason, Hamilton Square, N. J., and Harold Barnard, Houston, Tex., assignors to The Whitehead Brothers Rubber Company, Trenton, N. J., a corporation of New Jersey Application January 22, 1951, Serial No. 207,160

5 Claims. (Cl. 138—56)

The present invention relates to safety fittings for rotary drill hose.

In the drilling of wells by the rotary system, and particularly when the depth of the hole being drilled and the internal pressures to which the hose is subjected become great, the possibility of coupling failure in the hose represents a material hazard to the continuity of the operation and the safety of the personnel. To reduce this hazard to a minimum, it has been customary to attach a safety clamp in proximity to each end of the individual lengths of the rotary hose through the medium of which the said lengths can be joined together independently of the couplings or so secured to the rig that the parting of a coupling cannot result in flailing of the loose ends of the hose section or sections and resultant injury to personnel or damage to equipment. These clamps are conventionally composed of two semicircular straps of metal each passing half way around the hose with proximate ends thereof bolted together so that when completely installed and tightened they form a band embracing and gripping the hose. One or both of the straps of each clamp is provided with an eye to which chains or the like may be attached, the chains being anchored to the rig or extending between and connecting the clamps at opposite sides of the individual couplings.

This type of clamp has certain inherent faults. When tightened on the hose, for example, it has a tendency to compress and contract the wall of the hose with resulting restriction of the interior passage, and it is difficult to secure the clamp with adequate grip and at the same time to avoid such restriction. The clamp also has a pronounced abrasive and destructive effect upon the exterior of the hose and adversely affects its durability.

A principal object of the present invention is to provide a safety fitting which is free from the faults and undesirable characteristics of the prior clamps and which will constitute a material improvement thereover in major respects.

Another object of the invention is to provide a safety fitting which shall avoid possibility of mutilation or distortion of the hose body.

To these primary ends, the invention contemplates provision of a safety fitting constituting a built-in or integral element of the hose structure as hereinafter described and as illustrated in the attached drawings, wherein:

Fig. 1 is a side view of one end of a section of rotary hose having a safety fitting in accordance with our invention;

Fig. 2 is a fragmentary enlarged longitudinal sectional view of the hose showing details of the hose structure and the manner in which the fitting is incorporated therein;

Fig. 3 is a perspective view of the fitting prior to assembly in the hose structure; and Fig. 4 is a fragmentary sectional view illustrating a modification within the scope of the invention.

With reference to Figs. 1, 2 and 3 of the drawings, the fitting 2 therein illustrated consists primarily of a metallic sleeve 3 and staple elements welded or otherwise integrally attached thereto to form projecting eyelets 4, 5 and 6. This fitting is adapted for incorporation in integral manner in the structure of the hose body by the method set forth below.

As illustrated in Fig. 2, the hose body is composed in the present instance of an inner rubber tube 8, an outer rubber cover 9, and a carcass which consists in the present instance of inner and outer sections 10 and 11 built up of superimposed plies of fabric bonded together by a suitable rubber compound and vulcanized, respectively, to the tube 8 and cover 9, a plurality of intermediate layers 12 of rubber or rubberized material, and metallic reinforcing elements 13 in the form of spirally wound wires of various gauge. This hose corresponds in structure to that illustrated in United States Patent 2,506,494, and the coupling element indicated at 16 and constituting the terminal element of the particular section of hose illustrated in Fig. 1 may be formed and anchored in the end of the hose body in accordance with the principles disclosed in that patent.

The sleeve 3 is embedded in this composite hose body preferably externally of the reinforcing elements 13 as shown, and in the present instance is incorporated in the structure by means of a pour of molten metal indicated at 14, between the sleeve 3 and the adjoining reinforcing wires 13. The metal 14 may be introduced during the hose building process through an aperture 15 in the sleeve 3 of the fitting, and when solidified functions to join the sleeve integrally to a metallic reinforcing element 13 of the hose. The sleeve 3 of the fitting is embedded in the outer section 11 of the carcass which, as previously set forth, is built up of layers of rubberized fabric, and the eyelets 4, 5 and 6 project radially through the outer layers of the outer section 11 and through the cover 9 so as to be accessible at the outside of the hose. Following incorporation of the sleeve in the hose, as described above, the hose body is vulcanized to thereby integrally unite the rubber and rubberized elements of the hose structure into a highly integralized structure.

By forming the safety fitting as an integral part of the hose structure, the deficiencies of the prior devices are entirely eliminated. The fitting is inherently incapable of distorting and restricting the hose and its passage and actually affords additional reinforcement against distortion. External abrasion is avoided in obvious manner, and by anchoring the fitting to the metallic elements of the hose carcass, the strains imposed upon the hose body through the fittings are removed from the non-metallic portions of the hose and are distributed widely throughout the wall structure by way of the extensive metallic reinforcing structure.

In the embodiment of the invention shown in Fig. 4, advantage is taken of the presence in the hose structure of the coupling element 16. As illustrated, this element comprises a sleeve portion 17 which is securely anchored in the end of the hose body, by way, in part, of the aforesaid metallic elements 13 of the hose, and which meets the requirements for the inner or built-in base part of the safety fitting. An eyelet 18, or a plurality of such eyelets, is attached, by welding in the present instance, to the sleeve 17, and projects through and beyond the outer surface of the hose carcass to afford a medium for attachment to the hose of a safety chain or for anchoring the hose to a suitable support.

It will be understood that the invention is not restricted to the particular hose structure herein illustrated and will find useful application to hose of other construction. The fitting itself is also subject to modification as to form, with reference not only to the form of the built-in base portion but to the specific form, number and relative arrangement of the eyelets or equivalent exposed elements, without departure from the principle of the invention.

We claim:

1. Flexible hose comprising in combination a tubular hose body of rubber or like plastic material and having metallic reinforcing elements therein, a collar within said hose body and integrally connected to said metallic elements, and externally projecting means on said collar intersecting the wall of the hose body and exposed at the outside of the latter for connecting the collar to an external anchoring structure.

2. Flexible hose according to claim 1 wherein the metallic reinforcing elements take the form of an interior cylindrical sheath embraced by the said collar, and wherein further the collar is metallically bonded to the sheath.

3. Flexible hose according to claim 2 wherein the metallic bonding medium consists of a solidified body of metal of relatively low melting point, bonded to the surfaces of both the collar and the reinforcing elements.

4. Flexible hose comprising in combination a tubular hose body of rubber or like plastic material, a collar imbedded in and bonded to said body and constituting thereby an integral built-in element of the body structure, and externally projecting means on said collar intersecting the wall of the hose body and exposed at the outside of the latter for connecting the collar to an external anchoring structure.

5. Flexible hose comprising in combination a tubular hose body of rubber or like plastic material, a coupling element comprising a sleeve projecting into the hose body from an end of the latter and forming in effect a collar imbedded in and bonded to said body and constituting thereby an integral built-in element of the body structure, and externally projecting means on said sleeve intersecting the wall of the hose body and exposed at the outside of the latter for connecting the sleeve to an external anchoring structure.

WILLIAM L. STIVASON.
HAROLD BARNARD.

References Cited in the file of this patent

UNITED STATES PATENTS

| Number | Name | Date |
|---|---|---|
| Re. 22,988 | McLeish | Mar. 16, 1948 |
| 2,081,867 | Gysling | May 25, 1937 |
| 2,506,494 | Feiler et al. | May 2, 1950 |
| 2,518,981 | Edwards | Aug. 15, 1950 |
| 2,546,533 | Williamson | Mar. 27, 1951 |